(12) United States Patent
Marangoni et al.

(10) Patent No.: US 9,937,679 B2
(45) Date of Patent: Apr. 10, 2018

(54) TYRE CARCASS FORMING METHOD AND DRUM

(71) Applicant: Marangoni Meccanica S.p.A., Rovereto (IT)

(72) Inventors: Giogio Marangoni, Rovereto (IT); Viscardo Baldoni, Rovereto (IT)

(73) Assignee: Marangoni Meccanica S.p.A., Rovereto (IT)

( * ) Notice: Subject to any disclaimer, the term of this patent is extended or adjusted under 35 U.S.C. 154(b) by 291 days.

(21) Appl. No.: 14/727,208

(22) Filed: Jun. 1, 2015

(65) Prior Publication Data

US 2015/0283773 A1    Oct. 8, 2015

Related U.S. Application Data

(62) Division of application No. 12/594,555, filed as application No. PCT/IB2008/000743 on Mar. 28, 2008, now Pat. No. 9,044,910.

(30) Foreign Application Priority Data

Apr. 4, 2007    (IT) .............................. TO2007A0240

(51) Int. Cl.
| | |
|---|---|
| B29D 30/26 | (2006.01) |
| B29D 30/32 | (2006.01) |
| B29D 30/24 | (2006.01) |

(52) U.S. Cl.
CPC ........... *B29D 30/32* (2013.01); *B29D 30/245* (2013.01); *B29D 30/26* (2013.01);
(Continued)

(58) Field of Classification Search
CPC .................. B29D 30/32; B29D 30/245; B29D 2030/2614; B29D 2030/2621;
(Continued)

(56) References Cited

U.S. PATENT DOCUMENTS

| | | |
|---|---|---|
| 2,986,196 A | 5/1961 | Frazier |
| 3,053,308 A | 9/1962 | Vanzo et al. |

(Continued)

FOREIGN PATENT DOCUMENTS

| | | |
|---|---|---|
| DE | 1 579 253 | 7/1970 |
| EP | 0 884 168 A | 12/1998 |

(Continued)

OTHER PUBLICATIONS

Office action issued by Japanese Patent Office, dated Jun. 15, 2012, for corresponding Japanese application 2010-501605 with English translation.

*Primary Examiner* — Geoffrey L Knable
(74) *Attorney, Agent, or Firm* — McCarter & English, LLP

(57) ABSTRACT

To form a tire carcass, a body ply is wound about a drum, which has two half-drums movable axially in opposite directions to and from a center plane of the drum, and having respective turn-up bladders, on each of which is laid a respective annular lateral portion of the body ply; each annular lateral portion being turned up about a respective bead bundle and onto a sidewall of a toroidal-shaped annular central portion of the body ply by inflating the relative turn-up bladder and controlling distension of a given annular portion of the turn-up bladder so that, when inflation is completed, the annular portion assumes a given final position, in which an intermediate portion of the turn-up bladder rolls outwards along the relative sidewall of the annular central portion of the body ply.

20 Claims, 4 Drawing Sheets

(52) U.S. Cl.
CPC ............. *B29D 2030/2614* (2013.01); *B29D 2030/325* (2013.01); *B29D 2030/3228* (2013.01); *B29D 2030/3235* (2013.01); *B29D 2030/3242* (2013.01)

(58) Field of Classification Search
CPC .... B29D 2030/3221; B29D 2030/3228; B29D 2030/3235; B29D 2030/3242; B29D 2030/325; B29D 2030/3264
See application file for complete search history.

(56) References Cited

U.S. PATENT DOCUMENTS

| | | | |
|---|---|---|---|
| 3,438,832 A | 4/1969 | Cantarutti | |
| 3,853,653 A | 12/1974 | Olbert et al. | |
| 4,290,472 A | 9/1981 | Bryant | |
| 4,683,021 A | 7/1987 | Stalter | |
| 5,660,677 A | 8/1997 | Remond | |
| 6,676,788 B1 | 1/2004 | Roedseth et al. | |

FOREIGN PATENT DOCUMENTS

| | | |
|---|---|---|
| GB | 1141678 | 1/1969 |
| JP | 45-27467 | 9/1970 |
| JP | 51-116981 U | 9/1976 |
| JP | 59-067038 A | 4/1984 |
| JP | 07-060865 A | 3/1995 |
| JP | 09-117970 A | 5/1997 |

ID States 9,937,679 B2

TYRE CARCASS FORMING METHOD AND DRUM

This application is a division of U.S. patent application Ser. No. 12/594,555 filed Feb. 11, 2010 entitled "Tyre Carcass Forming Method and Drum" which application is a 371 of PCT/IB2008/000743 filed on Mar. 28, 2008, published on Oct. 16, 2008 under publication number WO 2008/122852 A and which claims priority benefits of Italian Patent Application No. TO2007A 000240 filed Apr. 4, 2007, the disclosures of which are all hereby incorporated by reference.

TECHNICAL FIELD

The present invention relates to a tyre carcass forming method and drum.

More specifically, the present invention relates to an improvement to a known forming method, which employs a drum comprising two half-drums movable axially in opposite directions to and from a central plane of the drum, and comprising respective turn-up bladders.

BACKGROUND ART

In this known method, a tyre carcass is formed by:
winding a body ply about the drum, so that two annular lateral portions of the body ply rest on the respective turn-up bladders;
fitting a respective bead bundle on each half-drum and respective annular lateral portion;
clamping the bead bundles in position on the drum; the beads defining, on the body ply, the two annular lateral portions outwards of the bead bundles, and a central portion between the bead bundles;
moving the two half-drums towards each other to form the central portion into a toroidal shape; and
once the central portion is shaped, applying air inflation pressure to expand the annular lateral portions outwards and about the respective bead bundles.

In the above known tyre carcass forming method, simply inflating the turn-up bladders is rarely sufficient, especially in the case of extensive turn-ups, to ensure firm adhesion of the turned-up annular lateral portions to the respective sidewalls of the toroidal central portion.

Consequently, each turn-up bladder is known to be associated with at least one respective push bladder located axially outwards of the relative turn-up bladder, and which, when inflated, presses the relative turn-up bladder against the relative sidewall of the central portion of the body ply. When so pressed, the turn-up bladder expands radially outwards to increase the portion of its outer surface adhering to the relative sidewall of the central portion, and so complete turn-up of the relative annular lateral portion of the body ply.

Using push bladders poses several drawbacks, on account of each turn-up bladder being expanded radially by the relative push bladder subjecting it to severe axial thrust, which, for an average-size tyre carcass, is in the region of a few tons, and is transmitted to the toroidal central portion of the body ply.

Bearing in mind that:
the carcass is green;
the axial thrust exerted by the push bladders can only be counteracted by feeding compressed air into the toroidal central portion of the body ply; and the greater the air pressure inside the central portion, the greater the problems posed in terms of airtightness and structural resistance of the central portion;
the only way of counteracting the axial thrust of the push bladders, in the case of relatively high turn-ups, is to inflate a central bladder inside the toroidal central portion, which involves added cost and equally serious structural problems.

In addition to structural problems, push bladders also pose size problems, by being located at least partly outwards of the relative turn-up bladders on the half-drums. As a result, the half-drums must be built long enough to support the relative push bladders, which means an increase in size, stronger drum supporting structures as a whole, and considerable added cost.

The above considerations apply even more so when, as in U.S. Pat. Nos. 5,660,677; 2,986,196, the push bladders are replaced by external hydraulically or pneumatically operated push devices. In which case, the external push devices not only greatly increase the axial size of the drum, but also make it substantially impossible to employ the drum on multidrum turrets commonly used in the tyre industry. Moreover, unlike push bladders, which subject the turn-up bladders to substantially evenly distributed stress, external push devices—normally comprising push cans—subject the turn-up bladders to more or less concentrated stress that greatly reduces the working life of the turn-up bladders.

DISCLOSURE OF INVENTION

It is an object of the present invention to provide a tyre carcass forming method that is cheap and easy to implement, while at the same time eliminating the aforementioned drawbacks.

According to the present invention, there is provided a tyre carcass forming method.

According to the present invention, there is provided a tyre carcass forming drum.

BRIEF DESCRIPTION OF THE DRAWINGS

A number of non-limiting embodiments of the present invention will be described by way of example with reference to the accompanying drawings, in which.

BEST MODE FOR CARRYING OUT THE INVENTION

Figure 2:
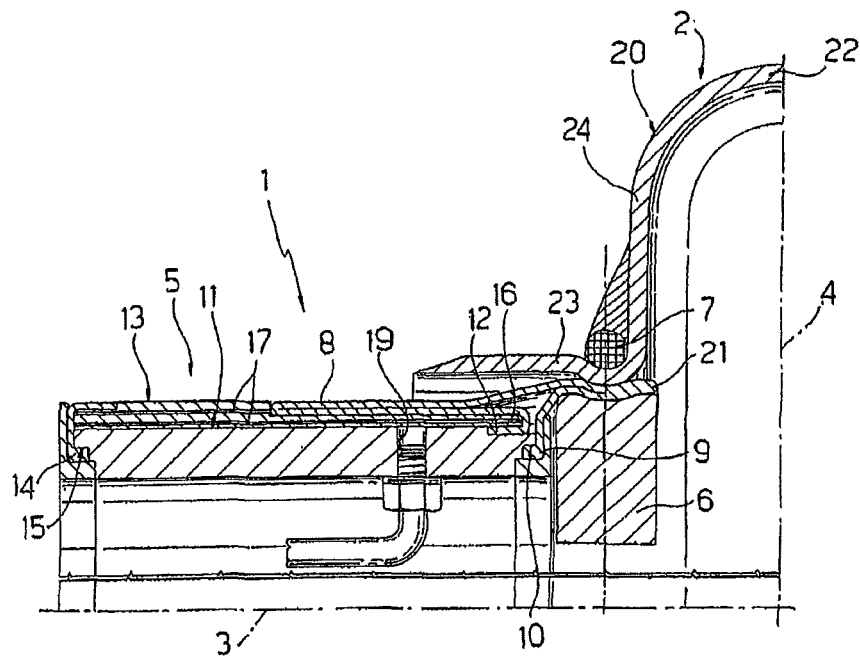
FIGS. 2 to 4 are similar to FIG. 1, and show the FIG. 1 drum in respective different operating positions.
Figure 3:
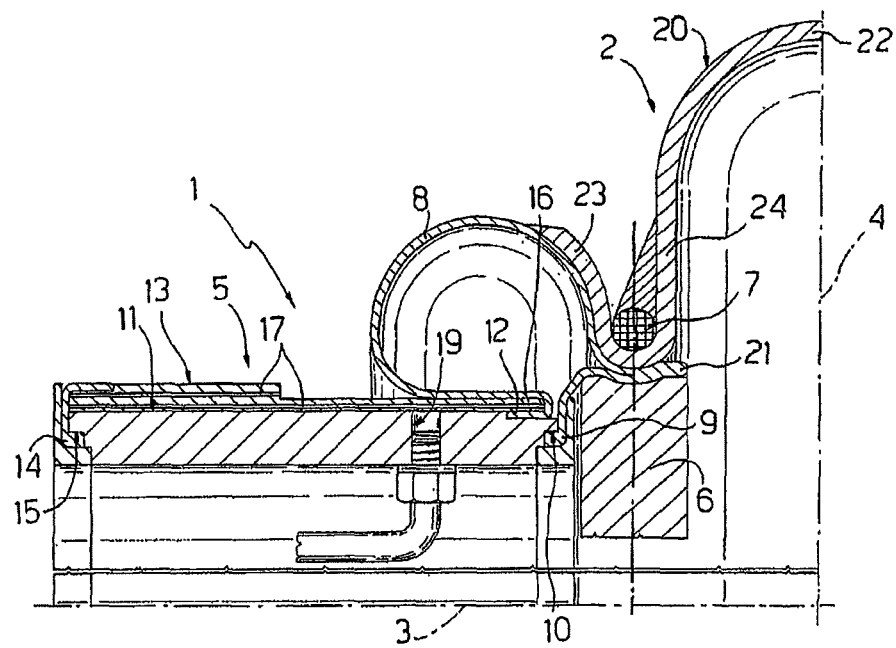
Figure 4:
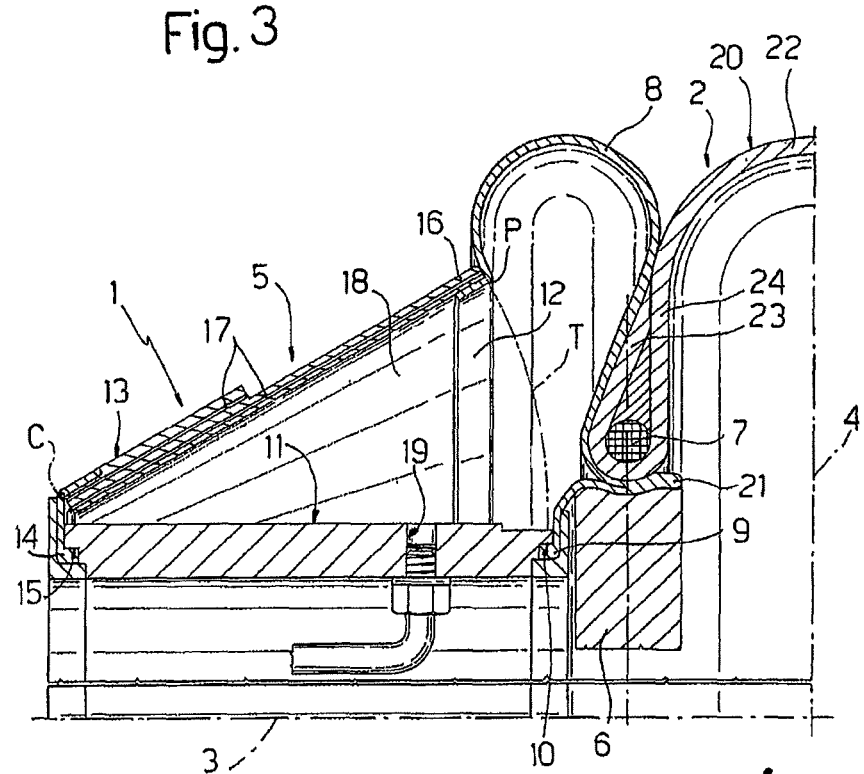

Number 1 in FIGS. 1 to 4 indicates as a whole a drum for forming a vehicle tyre carcass 2 (FIG. 4).

Drum 1 has a longitudinal axis 3 and a centre plane 4 perpendicular to longitudinal axis 3, and comprises two rigid half-drums 5 (only one shown) of fixed axial length, which are positioned specularly with respect to centre plane 4, are coaxial with longitudinal axis 3, and are movable axially in opposite directions to and from centre plane 4 by a known powered screw-nut screw transmission not shown.

Each half-drum 5 is fitted, at the end facing centre plane 4, with a respective known clamping device 6 for clamping a respective bead bundle 7, and supports a respective annular turn-up bladder 8, which lies, at rest, along half-drum 5, and has an inner annular fastening shoe 9 housed inside a respective annular groove 10 formed in a cylindrical outer surface 11 of half-drum 5, adjacent to clamping device 6. At the opposite end to inner annular fastening shoe 9, turn-up bladder 8 has an annular portion defining an outer annular fastening shoe 12, which, at rest, rests on outer surface 11.

Each half-drum 5 comprises an elastic tubular membrane 13, which, at rest (FIG. 1), rests on outer surface 11 of half-drum 5 and beneath turn-up bladder 8, has an annular fastening shoe 14 housed inside an annular groove 15 formed in cylindrical outer surface 11 of half-drum 5, adjacent to the free end of half-drum 5, and terminates, at the opposite end to fastening shoe 14, with an end portion 16 located close to annular groove 10 and connected integrally to outer fastening shoe 12 of turn-up bladder 8.

Figure 5:
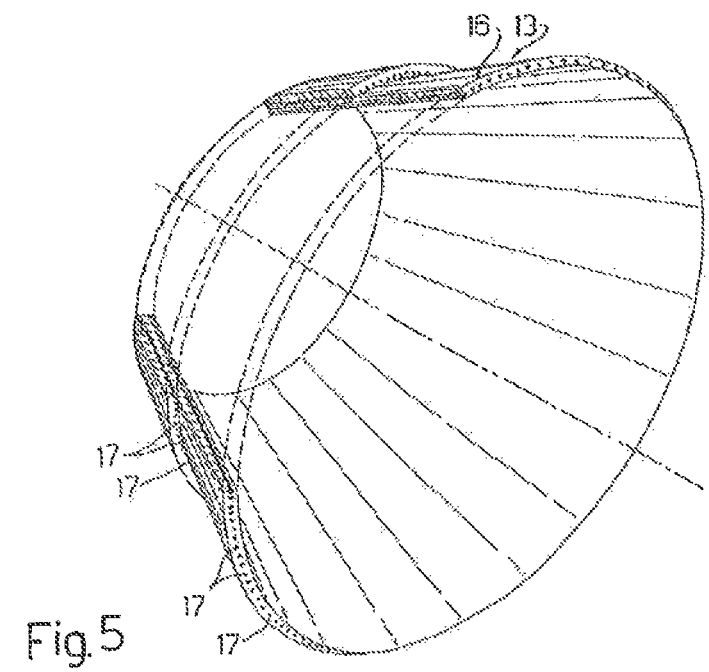
FIG. 5 shows a schematic view in perspective of a detail in FIG. 4.

As shown more clearly in FIG. 5, tubular membrane 13 decreases in thickness from fastening shoe 14, and is fitted inside with axial stiffeners 17 preferably defined by metal wires.

As shown more clearly in FIG. 4, each turn-up bladder 8 and relative tubular membrane 13 define, about outer surface 11 of relative half-drum 5, a single annular chamber 18, to which air inflation pressure can be applied by inflating it with compressed air by means of a known pneumatic circuit (not shown) communicating with annular chamber 18 via a conduit 19 extending through relative half-drum 5.

Figure 1:
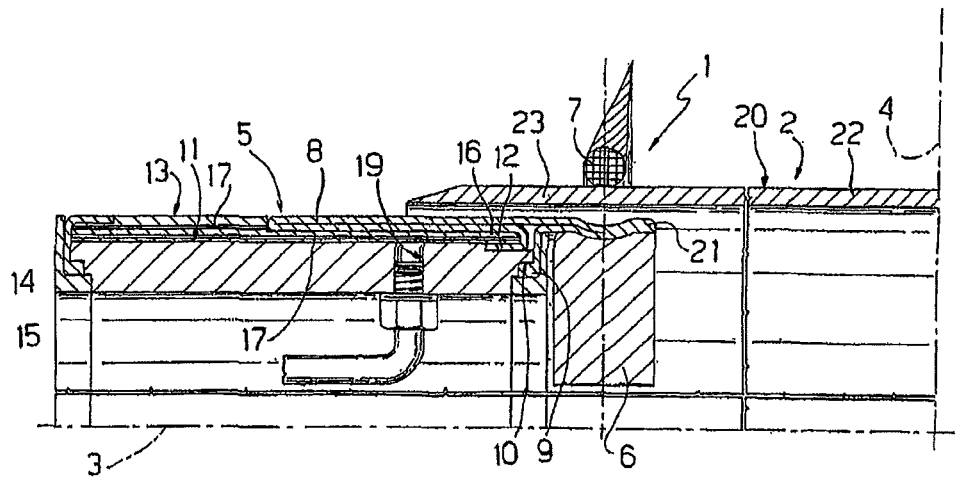
FIG. 1 shows a schematic partial axial and radial section of a first preferred embodiment of the drum according to the present invention.

In actual use, a body ply 20 is wound about drum 1 in the rest position shown in FIG. 1, in which the two half-drums 5 are a maximum distance apart, and turn-up bladders 8 are fully deflated and rest on the outer surface of respective tubular membranes 13, which rest on outer surface 11 of relative half-drums 5.

In this position, body ply 20 rests on each clamping device 6 with the interposition of a respective annular strip 21 defined by a lateral annular appendix of relative turn-up bladder 8, for the purpose explained below.

In this position, clamping devices 6 define, on body ply 20, an annular central portion 22 between the two clamping devices 6; and two annular lateral portions 23, each extending outwards of relative clamping device 6 and surrounding relative turn-up bladder 8.

Obviously, body ply 20 is not applied directly contacting drum 1, which is fitted first with other component parts not shown for the sake of simplicity, and which normally comprise a composite layer defined by a central innerliner, two lateral abrasion strips, and two outer sidewall strips.

A respective bead bundle 7 is then fitted to annular lateral portion 23 on each half-drum 5, and is clamped in position by expanding relative clamping device 6 in known manner (FIG. 2). At this point, compressed air is fed in known manner underneath annular central portion 22, and, at the same time, the two half-drums are moved towards each other and central plane 4 (FIG. 2) to form annular central portion 22 into a toroidal shape with two annular sidewalls 24 substantially perpendicular to longitudinal axis 3.

At this point, compressed air is fed along conduits 19 into annular chambers 18. As shown clearly in the drawings, turn-up bladders 8 being much more deformable than relative tubular membranes 13, the compressed air fed into annular chambers 18 first expands turn-up bladders 8 (FIG. 3) to partly fold annular lateral portions 23 outwards and about relative bead bundles 7, and then gradually flares tubular membranes 13 (FIG. 4), the end portion 16 of each of which is gradually distended by air inflation pressure only, thus gradually distending and raising outer fastening shoe 12 of the relative turn-up bladder substantially radially.

In connection with the above, it should be pointed out that, as each turn-up bladder 8 is distended, the relative tubular membrane 13, being axially rigid, acts as a conical brace to prevent substantially axial movement, and only permit substantially radial movement, of any point P along relative outer fastening shoe 12. More specifically, as turn-up bladder 8 is distended, the conical brace defined by relative tubular membrane 13 guides each point P along a substantially circular trajectory T, which is perpendicular to outer surface 11 of half-drum 5 at the point of intersection with outer surface 11, and extends in a radial plane through longitudinal axis 3 and point P, and about a respective centre C located at relative fastening shoe 14.

In other words, as each turn-up bladder 8 is distended, relative tubular membrane 13 forces a given annular portion of turn-up bladder 8—in the example shown, outer fastening shoe 12—to move substantially radially between a rest position on outer surface 11 of half-drum 5, and a given distended position coaxial with longitudinal axis 3.

Comparison of the FIGS. 3 and 4 configurations shows that, for each turn-up bladder 8:
  annular strip 21 performs the dual function of preventing compressed-air leakage from the chamber defined by toroidal annular central portion 22, and ensuring the expanding turn-up bladder 8 is kept as firmly as possible in contact with relative sidewall 24;
  radial distension of outer fastening shoe 12 pushes the whole of turn-up bladder 8 outwards towards relative sidewall 24;
  as a result, a central portion of turn-up bladder 8 rolls gradually along sidewall 24 to gradually turn annular lateral portion 23 of body ply 20 up onto sidewall 24;
  by virtue of the central portion of turn-up bladder 8 rolling, together with annular lateral portion 23, on sidewall 24, annular lateral portion 23 gradually adheres to sidewall 24 with no sliding movement between annular lateral portion 23 and turn-up bladder 8, on one side, and sidewall 24 on the other; and
  annular lateral portion 23 is gradually turned up completely onto sidewall 24 without subjecting toroidal annular central portion 22 to any additional axial stress, over and above that applied by expansion of turn-up bladder 8.

In the FIG. 1-5 embodiment, tubular membrane 13 decreases in thickness towards the centre plane, so that it flexes in much the same way as a leaf spring. However, a tubular membrane 13 of constant thickness (not shown), reinforced axially to brace and guide outer fastening shoe 12, is obviously also perfectly acceptable.

Figure 6:
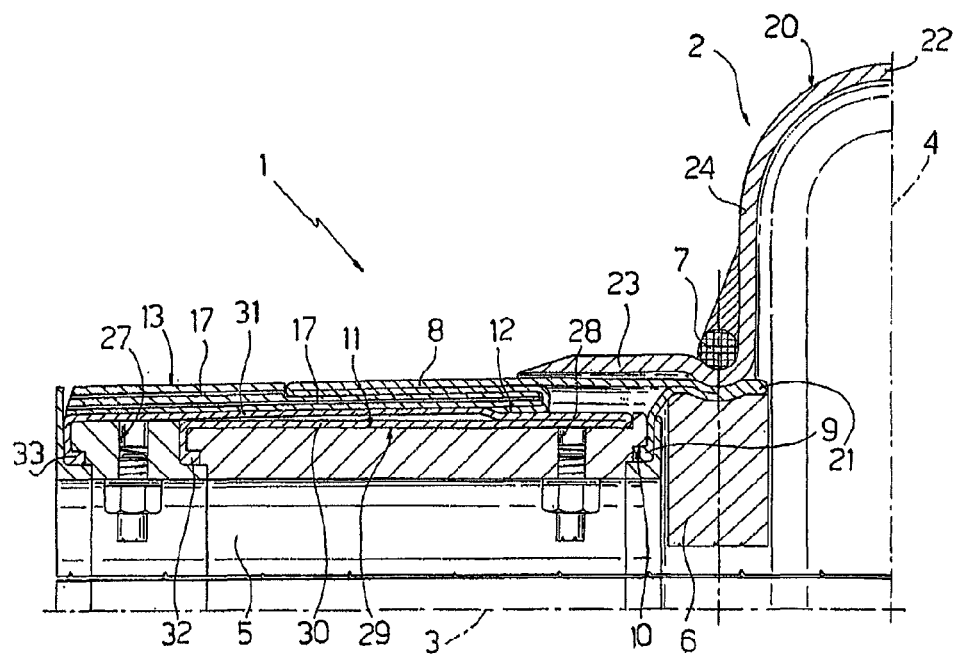
FIGS. 6 and 7 are similar to FIGS. 2 and 4 respectively, and show a first variation of the drum in FIGS. 1 to 4.
Figure 7:
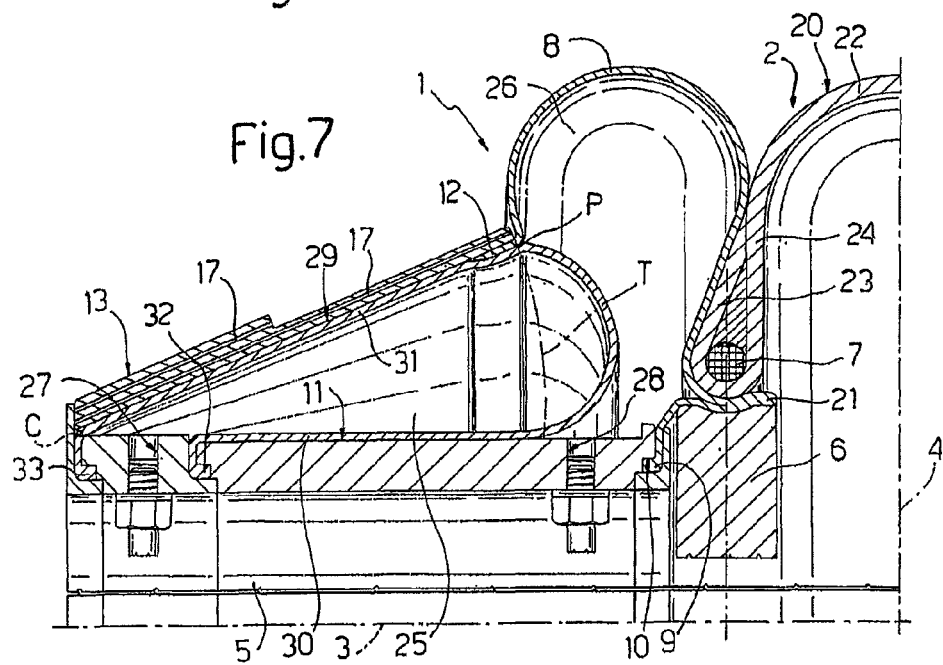

In the FIGS. 6 and 7 variation, to ensure even, balanced deformation of outer fastening shoes 12, i.e. to ensure each tubular membrane 13 flares coaxially with longitudinal axis 3, each annular chamber 18 is divided into two annular chambers 25 and 26, communicating with respective feed conduits 27 and 28, by a respective radial push bladder 29, which, when expanded (FIG. 7), has a section substantially in the form of an isosceles triangle with its apex facing the free end of half-drum 5, a radially inner side 30 contacting outer surface 11 of half-drum 5, and a radially outer side 31 covered with tubular membrane 13 and supporting outer fastening shoe 12 of turn-up bladder 8 at the end facing centre plane 4. Radial push bladder 29 is connected to half-drum 5 by two fastening shoes 32 and 33 connected to the outer ends of respective sides 30, 31, and housed in respective annular grooves formed in half-drum 5, on opposite sides of conduit 27.

Figure 8:
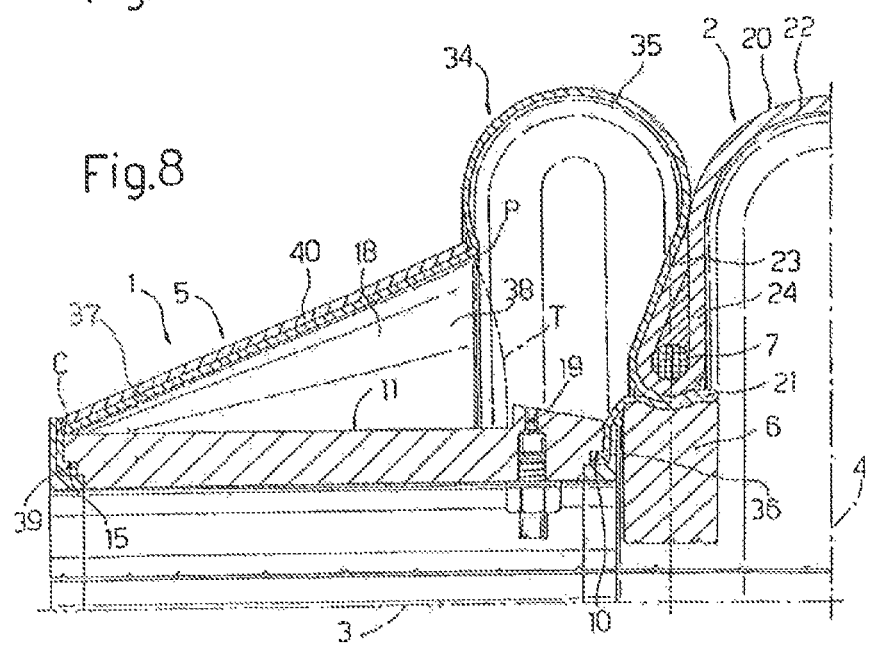
FIG. 8 is similar to FIG. 7, and shows a second variation of the drum in FIGS. 1 to 5.

The FIG. 8 variation is similar to the FIG. 1-5 embodiment, except that each half-drum 5 only supports a turn-up bladder 34 comprising a portion 35 corresponding in shape and size to a turn-up bladder 8, and secured to half-drum 5 by an inner fastening shoe 36 corresponding to an inner fastening shoe 9; and a further portion 37, which, at one end, has an inner annular end portion 38 integral with an outer end portion of portion 35, and is secured to half-drum 5, at the other end, by an outer fastening shoe 39 corresponding to a fastening shoe 14. Portion 37 is reinforced with longitudinal ribs 40, which are fitted integrally to the outer surface of portion 37, extend the whole length of portion 37, and provide for bracing and guiding each point P of inner annular end portion 38 along trajectory T and about centre C as described with reference to the FIG. 1-5 embodiment.

The FIG. 8 variation performs in the same way as the FIG. 1-5 embodiment, and so requires no further explanation.

What is claimed is:

1. A drum for forming a tyre carcass, the drum having a longitudinal axis, and comprising two half-drums and two turn-up bladders, each of which is mounted on a respective half-drum and comprises an intermediate portion and an annular portion,
    wherein the annular portion is arranged, at rest, in contact with the respective half-drum and beneath the intermediate portion;
    the half-drums being of fixed axial length, being movable in opposite directions along the longitudinal axis to and from a centre plane of the drum, and being covered externally with the respective turn-up bladders, each of which has at least a first annular shoe connected directly to the respective half-drum; and
    pneumatic inflation means for distending a given annular portion of each turn-up bladder;
    the drum comprising, on each half-drum, guide means, which are axially fixed with respect to the half-drum, are rigidly connected to said annular portion so as to move therewith and are activated by the pneumatic inflation means to move the annular portion into a given final position,
    wherein the guide means are rigidly connected to the half-drum at a fixed point which is axially arranged outside the respective annular portion when the annular portion is both at rest and distended; and
    wherein the guide means are axially more rigid than the turn-up bladders to result, when each turn-up bladder is distended, in the guide means acting as a substantially conical brace to prevent substantially axial movement, and only permit substantially radial movement of any point of the annular portion along a substantially radial trajectory with respect to the longitudinal axis, and also to result in the intermediate portion being axially pushed towards a respective sidewall of the tyre carcass.

2. A drum as claimed in claim 1,
    wherein said final position of said annular portion is a position coaxial with said longitudinal axis.

3. A drum as claimed in claim 1,
    wherein the guide means guide each point of the annular portion along a respective fixed trajectory in relation to the relevant half-drum as the annular portion is distended between an undeformed initial position and said final position.

4. A drum as claimed in claim 3,
    wherein said trajectory is a substantially radial trajectory in a radial plane through the longitudinal axis and said point.

5. A drum as claimed in claim 3,
    wherein said trajectory is a circular trajectory in a radial plane through the longitudinal axis and said point.

6. A drum as claimed in claim 5,
    wherein the circular trajectory of each point of the annular portion extends about a centre which defines said fixed point, lies in the respective said radial plane, outside the respective turn-up bladder, and on an outer surface of the respective half-drum.

7. A drum as claimed in claim 1,
    wherein each turn-up bladder has a second annular shoe defining the respective said annular portion.

8. A drum as claimed in claim 7,
    wherein the guide means comprise, for each half-drum, a tubular membrane, which is fitted in an axially fixed position to the respective half-drum, and is elastically deformable radially, but substantially rigid axially, and rests, at rest, on the respective half-drum beneath the respective turn-up bladder;
    an end portion, facing the centre plane, of the tubular membrane being fitted with the second annular shoe of the respective turn-up bladder.

9. A drum as claimed in claim 8,
    wherein the tubular membrane vanes in thickness longitudinally.

10. A drum as claimed in claim 8,
    wherein the tubular membrane decreases in thickness towards the centre plane.

11. A drum as claimed in claim 8,
    wherein the tubular membrane comprises axial stiffeners.

12. A drum as claimed in claim 8,
    wherein the tubular membrane defines, with the respective turn-up bladder, a single annular chamber;
    the pneumatic inflation means comprising a single compressed-air feed means communicating with said annular chamber and for applying the air inflation pressure.

13. A drum as claimed in claim 12,
    wherein, at the opposite end to that facing the centre plane, the tubular membrane comprises a respective fastening shoe for attachment to the respective half-drum.

14. A drum as claimed in claim 13,
    wherein the guide means comprise, for each turn-up bladder, a number of ribs secured axially to the respective second portion.

15. A drum as claimed in claim 7, and comprising, for each turn-up bladder, a radial push bladder located on the opposite side of the turn-up bladder to the centre plane;
    each radial push bladder supporting the second annular shoe of the respective turn-up bladder, and the respective said guide means, and communicating with said pneumatic inflation means.

16. A drum as claimed in claim 15,
    wherein the radial push bladder, when expanded, has a substantially triangular section;
    a radially inner first side of the radial push bladder being positioned contacting an outer surface of the respective half-drum; and
    a radially outer second side of the radial push bladder supporting the guide means and the second annular shoe of the respective turn-up bladder.

17. A drum as claimed in claim 15,
wherein, on each half-drum, said pneumatic inflation means comprise a first and a second feed means for feeding compressed air to the radial push bladder and the turn-up bladder respectively.

18. A drum as claimed in claim 17,
wherein the radial push bladder comprises two shoes for direct connection to the respective half-drum;
said two shoes being located side by side, close to a free end of the respective half-drum, and on opposite sides of the first feed means.

19. A drum as claimed in claim 1,
wherein each turn-up bladder comprises a first and a second annular shoe fitted to the opposite ends of the respective half-drum;
a first portion adjacent to the first annular shoe; and
a second portion adjacent to the second annular shoe;
the guide means being located on the second portion; and
said annular portion being an end portion for attaching the second portion to the first portion.

20. A drum as claimed in claim 19,
wherein the guide means are means for axially stiffening the second portion.

* * * * *